(12) United States Patent
Nakamura

(10) Patent No.: US 9,768,618 B2
(45) Date of Patent: Sep. 19, 2017

(54) POWER SUPPLY SYSTEM AND POWER SOURCE APPARATUS

(71) Applicant: KYOCERA CORPORATION, Kyoto (JP)

(72) Inventor: Kazutaka Nakamura, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 519 days.

(21) Appl. No.: 14/372,072

(22) PCT Filed: Jan. 17, 2013

(86) PCT No.: PCT/JP2013/050776
§ 371 (c)(1),
(2) Date: Jul. 14, 2014

(87) PCT Pub. No.: WO2013/108827
PCT Pub. Date: Jul. 25, 2013

(65) Prior Publication Data
US 2014/0354059 A1 Dec. 4, 2014

(30) Foreign Application Priority Data

Jan. 20, 2012 (JP) .................................. 2012-010500

(51) Int. Cl.
*H02J 4/00* (2006.01)
*H02J 3/38* (2006.01)
(Continued)

(52) U.S. Cl.
CPC ........ *H02J 4/00* (2013.01); *H02J 3/28* (2013.01); *H02J 3/38* (2013.01); *H02J 3/46* (2013.01);
(Continued)

(58) Field of Classification Search
CPC ........ H02J 3/28; H02J 3/38; H02J 3/46; H02J 4/00; H02J 7/02; H02J 9/062; H02M 7/42;
(Continued)

(56) References Cited

U.S. PATENT DOCUMENTS 8,058,746 B2 11/2011 Suekane et al.
2007/0139019 A1* 6/2007 Wiegman .................. H02J 3/46
322/19

(Continued)

FOREIGN PATENT DOCUMENTS

EP 1798836 A1 6/2007
JP 2002-199592 A 7/2002
(Continued)

OTHER PUBLICATIONS

Extended European Search Report dated Sep. 10, 2015 issued by the European Patent Office for Counterpart European Application No. 13739100.9.
(Continued)

*Primary Examiner* — Thienvu Tran
*Assistant Examiner* — Brian K Baxter
(74) *Attorney, Agent, or Firm* — Procopio Cory Hargreaves and Savitch LLP

(57) ABSTRACT

A power supply system comprising a power source apparatus connected at a junction point P1 to a system power source line L0 provided between a system power source and a load device, and a power source apparatus connected at a junction point P2 to the system power source line L0. The power supply system includes a current sensor CT2-1 provided on the system power source line (L0) between the system power source and the junction point P1, a current sensor CT2-2 provided on the power source apparatus power source line L1 between the power source apparatus and the
(Continued)

junction point P1, and a current sensor CT2-3 provided on the system power source line L0 between the junction point P1 and the junction point P2. The power source apparatus controls the output of power from the power source apparatus, on the basis of the outputs from current sensors CT2-1, CT2-2, CT2-3.

10 Claims, 4 Drawing Sheets

(51) Int. Cl.
      *H02J 3/46*       (2006.01)
      *H02J 3/28*       (2006.01)
      *H02J 7/02*       (2016.01)
      *H02M 7/42*       (2006.01)
      *H02J 9/06*       (2006.01)
      *H01M 16/00*       (2006.01)

(52) U.S. Cl.
    CPC ............... *H02J 7/02* (2013.01); *H02M 7/42* (2013.01); *H01M 16/006* (2013.01); *H02J 9/062* (2013.01); *Y10T 307/609* (2015.04)

(58) Field of Classification Search
    CPC . H01M 16/006; Y10T 307/609; H04W 52/24; H04W 52/50; H04W 52/367; H04W 52/12; H04W 52/40; H01L 27/0266; H01L 27/0251; H01L 27/0255; H01L 27/0262; H02H 9/046
    USPC ................. 307/63; 455/522, 69; 361/56
    See application file for complete search history.

(56) References Cited

U.S. PATENT DOCUMENTS

| | | | |
|---|---|---|---|
| 2008/0073979 A1* | 3/2008 | Wiegman | H02J 3/46 307/84 |
| 2008/0143188 A1* | 6/2008 | Adest | H02J 1/102 307/82 |
| 2009/0027932 A1* | 1/2009 | Haines | H02J 9/062 363/95 |
| 2009/0267415 A1 | 10/2009 | Suekane et al. | |
| 2012/0021317 A1* | 1/2012 | Shigezumi | H01M 8/0494 429/432 |
| 2012/0267957 A1* | 10/2012 | Czarnecki | H02J 3/02 307/64 |

FOREIGN PATENT DOCUMENTS

| | | |
|---|---|---|
| JP | 2004-362787 A | 12/2004 |
| JP | 2005-130572 A | 5/2005 |
| WO | 2007/066707 A1 | 6/2007 |

OTHER PUBLICATIONS

International Search Report; PCT/JP2013/050776; Mar. 26, 2013.

* cited by examiner

POWER SUPPLY SYSTEM AND POWER SOURCE APPARATUS

TECHNICAL FIELD

The present invention relates to a power supply system in which a plurality of power sources are jointly used and a power source apparatus.

BACKGROUND ART

Conventionally, a power consumer has witnessed the widespread use of a distributed power source apparatus.

In recent years, there are an increasing number of cases where a plurality of power source apparatuses are jointly used. For example, when a storage battery is introduced to a consumer in which a fuel cell is provided, it is possible to cover an insufficient amount of power supplied from the fuel cell to a load device by using the storage battery (for example, see Patent Literature 1).

Further, a reverse power flow, to a grid power source, of output power from a power source apparatus, such as a fuel cell and a storage battery may be prohibited. In this case, it is general that a current sensor for preventing a reverse power flow is provided on a grid power source line, and on the basis of the output from the power sensor, the output from the power source apparatus is controlled so that a reverse power flow is not generated.

CITATION LIST

Patent Literature

[PTL 1] Japanese Unexamined Patent Application Publication No. 2004-362787

SUMMARY OF INVENTION

When a plurality of power source apparatuses are jointly used, it is desired that a preferentially used power source apparatus is switched depending on each situation.

However, for example, when the reverse power flow is prohibited, and/or when it is not possible to perform communication between power source apparatuses, it is difficult to enable switching of the preferentially used power source apparatus.

Therefore, it is an object of the present invention to provide a power supply system capable of switching a preferentially used power source apparatus, and a power source apparatus.

In order to solve the above problems, the present invention has the following features.

A characteristic of the present invention is summarized in that a power supply system, comprising: a first power source apparatus and a second power source apparatus electrically connected with a grid power source line provided between a grid power source and a load device, a power source line of the first power source apparatus being joined with the grid power source line at a first junction, and a power source line of the second power source apparatus being joined with the grid power source line at a second junction provided nearer the load device with respect to the first junction, wherein the power supply system comprises: a first current sensor provided on the grid power source line between the grid power source and the first junction; a second current sensor provided on the power source line of the first power source apparatus between the first power source apparatus and the first junction; and a third current sensor provided on the grid power source line between the first junction and the second junction, wherein the second power source apparatus controls output of power from the second power source apparatus itself, on the basis of each of the outputs from the first current sensor, the second current sensor, and the third current sensor.

In the power supply system, in a first priority mode in which the first power source apparatus is preferentially used, the second power source apparatus suspends the output of power from the second power source apparatus itself until the first power source apparatus operates by regulated output, on the basis of the output from the second current sensor.

In the power supply system, in the first priority mode, the second power source apparatus checks, on the basis of the output from the second current sensor, whether the first power source apparatus is operated by the regulated output, and when power purchased from the grid power source is detected on the basis of the output from the first current sensor, the second power source apparatus outputs power from the second power source apparatus itself.

In the power supply system, in the second priority mode where the second power source apparatus is preferentially used, the second power source apparatus outputs the power from the second power source apparatus itself while preventing a reverse power flow to the grid power source on the basis of the output from the third current sensor.

In the power supply system, further comprising: an input switching unit that is provided between each of the outputs from the first current sensor, the second current sensor, and the third current sensor, and the second power source apparatus, wherein the input switching unit switches input to the second power source apparatus from among the output from the first current sensor, the output from the second current sensor, and the output from the third current sensor, in accordance with the priority mode of the second power source apparatus.

In the power supply system, further comprising: a control device that controls to switch the priority mode of the second power source apparatus on the basis of an output-power unit price of the first power source apparatus and an output-power unit price of the second power source apparatus.

In the power supply system, further comprising: a control device, wherein the first power source apparatus or the second power source apparatus is a fuel cell with which a hot-water storage device is provided, and the control device controls to switch the priority mode of the second power source apparatus on the basis of an amount of hot water stored in the hot-water storage device.

A characteristic of the present invention is summarized in that a power supply system, comprising: a first power source apparatus and a second power source apparatus electrically connected with a grid power source line provided between a grid power source and a load device, a power source line of the first power source apparatus being joined with the grid power source line at a first junction, and a power source line of the second power source apparatus being joined with the grid power source line at a second junction provided nearer the load device with respect to the first junction, wherein the power supply system comprises: a first current sensor provided on the grid power source line between the grid power source and the first junction; and a second current sensor provided on the power source line of the first power source apparatus between the first power source apparatus and the first junction, wherein in a first priority mode in which the first power source apparatus is preferentially used, the second power source apparatus controls the output of power from the second power source apparatus itself, on the basis of each of the outputs from the first current sensor and the second current sensor.

A characteristic of the present invention is summarized in that a power source apparatus electrically connected with a grid power source line provided between a grid power source and a load device, comprising: a first current sensor provided on the grid power source line between the grid power source and a first junction; a second current sensor provided on a power source line of an alternate power source apparatus between the alternate power source apparatus and the first junction; and a third current sensor provided on the grid power source line between the first junction and a second junction, wherein the power source line of the alternate power source apparatus is joined with the grid power source line at the first junction, the power source line of the power source apparatus is joined with the grid power source line at the second junction provided nearer the load device with respect to the first junction, and the power source apparatus controls output of power from the power source apparatus itself, on the basis of each of the outputs from the first current sensor, the second current sensor, and the third current sensor.

A characteristic of the present invention is summarized in that a power source apparatus electrically connected with a grid power source line provided between a grid power source and a load device, comprising: a first current sensor provided on the grid power source line between the grid power source and a first junction, and a second current sensor provided on a power source line of an alternate power source apparatus between the alternate power source apparatus and the first junction, wherein the power source line of the alternate power source apparatus is joined with the grid power source line at the first junction, the power source line of the power source apparatus is joined with the grid power source line at a second junction provided nearer the load device with respect to the first junction, and in a first priority mode in which the alternate power source apparatus is preferentially used, the power source apparatus controls the output of power from the power source apparatus itself, on the basis of each of the outputs from the first current sensor and the second current sensor.

According to the present invention, it is possible to provide a power supply system capable of switching a preferentially used power source apparatus, and a power source apparatus.

DESCRIPTION OF EMBODIMENTS

Figure 1:
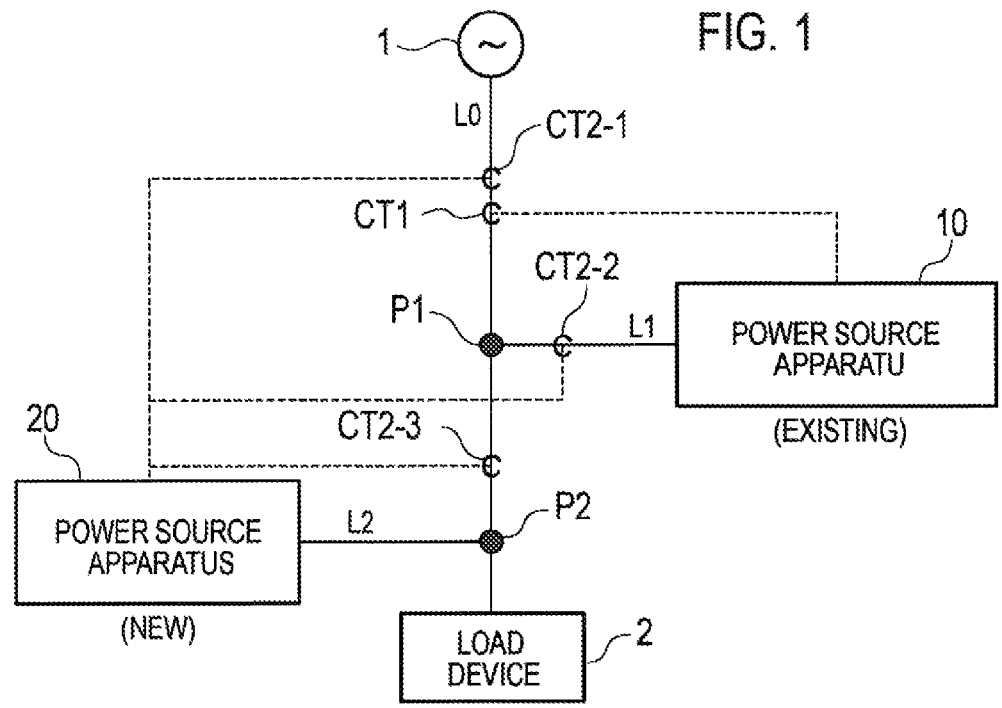
FIG. 1 is a configuration diagram of a power supply system according to an embodiment of the present invention.

With reference to drawings, an embodiment of the present invention and an example thereof will be described. In the drawings according to an embodiment and an example below, identical or similar symbols are assigned to identical or similar portions.

Embodiment (System Configuration)

FIG. 1 is a configuration diagram of a power supply system according to the present embodiment.

In the present embodiment, a system configuration will be described where a power source apparatus 20 is additionally provided in a consumer where a power source apparatus 10 is already provided. Further, in FIG. 1, a solid line between blocks indicates a power source line and a dotted line between blocks indicates a control line. The control line may be wired or may be wireless.

As shown in FIG. 1, the power supply system according to the present embodiment includes a load device 2 that consumes power, the power source apparatus 10 that outputs power to be supplied to the load device 2, and the power source apparatus 20 that outputs power to be supplied to the load device 2.

In the power source apparatus 10 and the power source apparatus 20, a reverse power flow to a grid power source 1 is prohibited. For example, the power source apparatus 10 is a fuel cell and the power source apparatus 20 is a storage battery. Alternatively, the power source apparatus 10 may be a storage battery and the power source apparatus 20 may be a fuel cell.

The power source apparatus 10 is a power source apparatus provided in a consumer before the power source apparatus 20, and does not include a function of communicating with another power source apparatus. Thus, the power source apparatus 10 is not capable of communicating with the power source apparatus 20 to be additionally provided.

To the power source apparatus 10, a current sensor CT1 for preventing a reverse power flow is connected via the control line. To the power source apparatus 20, current sensors CT2-1, CT2-2, and CT2-3 are connected via the control line.

Between the grid power source 1 and the load device 2, a grid power source line L0 is provided which is for supplying power from the grid power source 1, to the load device 2.

To the grid power source line L0, the power source apparatus 10 is connected via a power source line L1. The power source line L1 is joined with the grid power source line L0 at a junction P1. The power output from the power source apparatus 10 is supplied to the load device 2 via the power source line L1 and the grid power source line L0. That is, the power source apparatus 10 performs an interconnection operation with the grid power source 1.

The current sensor CT1 of the power source apparatus 10 is provided on the grid power source line L0 between the grid power source 1 and the junction P1. The power source apparatus 10 controls the output of power from the power source apparatus 10 on the basis of the output from the current sensor CT1. More particularly, the power source apparatus 10 controls the output from the power source apparatus 10 not to flow to the grid power source 1 side with respect to the current sensor CT1 (that is, so that a reverse power flow is not generated). Further, the power source apparatus 10 detects an amount of power to be supplied (amount of power purchased) from the grid power source 1 in accordance with the output from the current sensor CT1, and controls the output from the power source apparatus 10 so that an amount of power supplied from the grid power source 1 is zero, for example.

Further, to the grid power source line L0, the power source apparatus 20 is connected via a power source line L2. The power source line L2 is joined with the grid power source line L0 at a junction P2. In this case, the junction P2 is provided nearer the load device 2 with respect to the junction P1. The power output from the power source apparatus 20 is supplied to the load device 2 via the power source line L2 and the grid power source line L0. That is, the power source apparatus 20 performs an interconnection operation with the grid power source 1.

The current sensor CT2-1 of the power source apparatus 20 is provided on the grid power source line L0 between the grid power source 1 and the junction P1. On the grid power source line L0, the current sensor CT2-1 may be provided nearer the grid power source 1 with respect to the current sensor CT1, or may be provided nearer the load device 2 side with respect to the current sensor CT1. The current sensor CT2-2 of the power source apparatus 20 is provided on the power source line L1 of the power source apparatus 10, between the power source apparatus 10 and the junction P1. The current sensor CT2-3 of the power source apparatus 20 is provided on the grid power source line L0 between the junction P1 and the junction P2. The power source apparatus 20 controls the output of power from the power source apparatus 20 on the basis of each output from the current sensor CT2-1, the current sensor CT2-2, and the current sensor CT2-3.

More particularly, the power source apparatus 20 has two priority modes, that is, a first priority mode in which the power source apparatus 10 is preferentially used and a second priority mode in which the power source apparatus 20 is preferentially used. In the first priority mode, the power source apparatus 20 detects the output from the power source apparatus 10 in accordance with the output from the current sensor CT2-2 to check whether the power source apparatus 10 is operated by regulated output. In this case, the regulated output is rated output (normally, maximum output), for example. The power source apparatus 20 suspends the output of power from the power source apparatus 20 until the power source apparatus 10 is operated by the regulated output. Further, in the first priority mode, the power source apparatus 20 checks, on the basis of the output from the current sensor CT2-2, that the power source apparatus 10 is operated by the regulated output, and when the power source apparatus 20 detects power purchased (that is, power supplied from the grid power source 1) from the grid power source 1, on the basis of the output from the current sensor CT2-1, outputs the power from the power source apparatus 20.

As a result, in the first priority mode, only an insufficient amount of power supplied from the power source apparatus 10 to the load device 2 is covered by the output from the power source apparatus 20. Thus, in the first priority mode, unless the power supplied from the power source apparatus 10 to the load device 2 is insufficient, the power source apparatus 20 does not output the power. Therefore, the first priority mode is suitable when an output-power unit price of the power source apparatus 10 is more reasonable than an output-power unit price of the power source apparatus 20, for example.

In the second priority mode in which the power source apparatus 20 is preferentially used, the power source apparatus 20 outputs the power from the power source apparatus 20 while preventing the reverse power flow to the grid power source 1 on the basis of the output from the current sensor CT2-3. More particularly, the power source apparatus 20 detects an amount of power to be supplied from the grid power source 1 and the power source apparatus 10 in accordance with the output from the current sensor CT2-3, and controls the output from the power source apparatus 20 so that the detected amount of power supplied is zero, for example.

As a result, in the second priority mode, only an insufficient amount of power supplied from the power source apparatus 20 to the load device 2 is covered by the power source apparatus 10. Thus, in the second priority mode, unless the power supplied from the power source apparatus 20 to the load device 2 is insufficient, the output from the power source apparatus 10 is decreased or suspended. Therefore, the second priority mode is suitable when the output-power unit price of the power source apparatus 20 is more reasonable than the output-power unit price of the power source apparatus 10, for example.

Thus, according to the present embodiment, even when the reverse power flow is prohibited and when it is not possible to perform communication between the power source apparatuses 10, 20, it is possible to switch the preferentially used power source apparatus (that is, switch a mode between the first priority mode and the second priority mode).

The mode switching may be performed by a user's operation on the power source apparatus 20, may be performed on the basis of a switching reference previously set to the power source apparatus 20, or may be performed by an instruction from an external device of the power source apparatus 20, for example. For example, the switching reference may be set on the basis of the output-power unit price of the power source apparatus 10 and the power source apparatus 20.

(Operation Flow)

Figure 2:
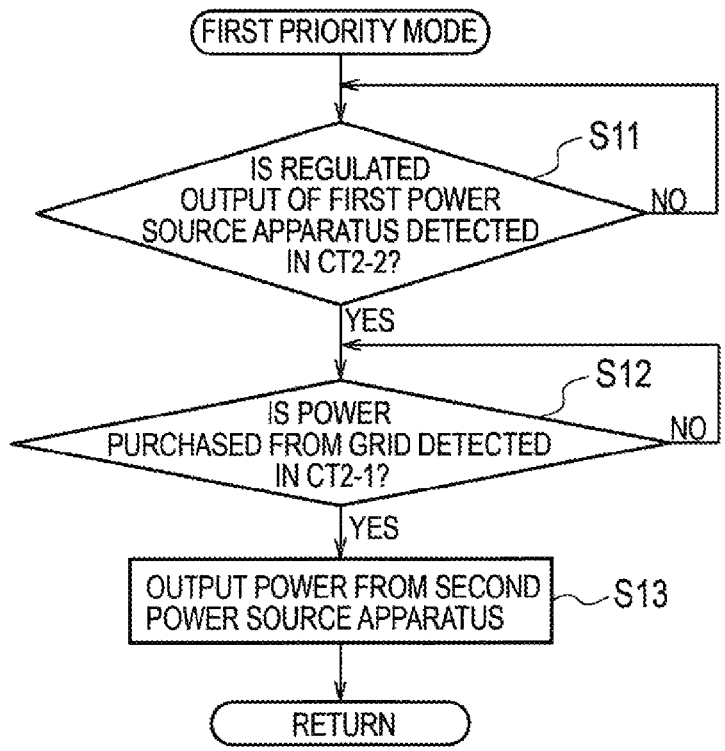
FIG. 2 is an operation flowchart of a power source apparatus in a first priority mode.

FIG. 2 is an operation flowchart of the power source apparatus 20 in the first priority mode.

As shown in FIG. 2, in step S11, the power source apparatus 20 detects the output from the power source apparatus 10 in accordance with the output from the current sensor CT2-2 to check whether the power source apparatus 10 is operated by regulated output. When the power source apparatus 10 is operated by the regulated output (step S11; YES), the process is proceeded to step S12.

In step S12, the power source apparatus 20 detects the amount of power supplied from the grid power source 1 in accordance with the output from the current sensor CT2-1 to check whether the power is purchased from the grid power source 1. When the power is purchased from the grid power source 1 (step S12; YES), the process is proceeded to step S13.

In step S13, the power source apparatus 20 outputs the power from the power source apparatus 20 while preventing the reverse output power flow to the grid power source 1 on the basis of the output from the CT2-1. In this case, the power source apparatus 20 operates to increase the output from the power source apparatus 20. In step S12, when the power is not purchased from the grid power source 1 (step S12; NO), the power source apparatus 20 operates, at least, to not increase (for example, to decrease) the output from the power source apparatus 20. Thereafter, the process is returned to step S11.

Figure 3:
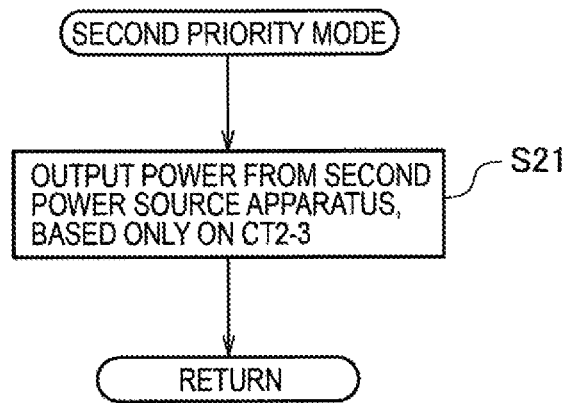
FIG. 3 is an operation flowchart of a power source apparatus in a second priority mode.

FIG. 3 is an operation flowchart of the power source apparatus 20 in the second priority mode.

As shown in FIG. 3, in step S21, the power source apparatus 20 outputs the power from the power source apparatus itself 20, while preventing the reverse output power flow to the grid power source 1 on the basis only of the output from the current sensor CT2-3.

Comparative Example

Next, with reference to FIG. 4 to FIG. 6, a comparative example of the above-described embodiment will be described.

Figure 4:
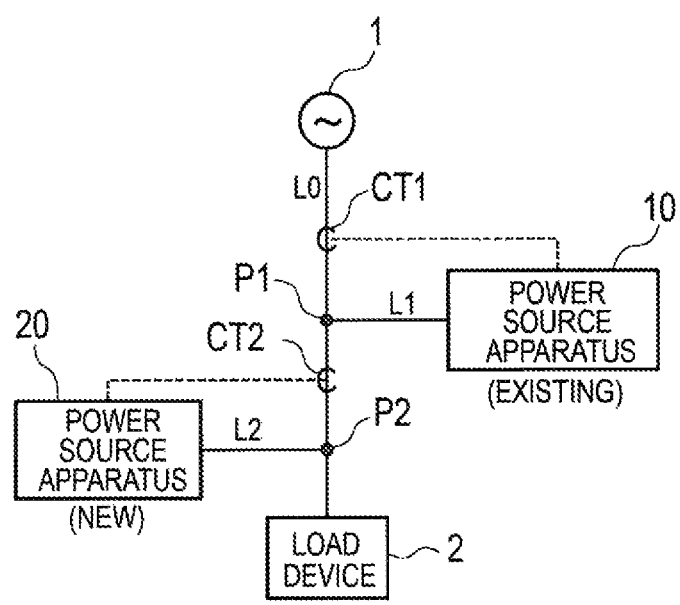
FIG. 4 shows a first comparative example of the embodiment of the present invention.

In a first comparative example shown in FIG. 4, the power source apparatus 20 has one current sensor CT2, and the current sensor CT2 is provided between the junction P1 and the junction P2. In such a configuration, the power source apparatus 20 is preferentially used all the time, and it is not possible to preferentially use the power source apparatus 10.

Figure 5:
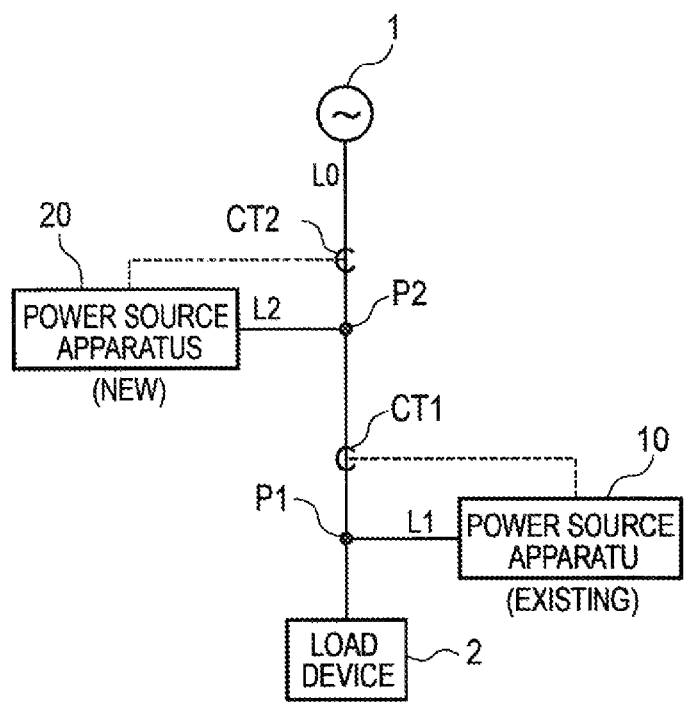
FIG. 5 shows a second comparative example of the embodiment of the present invention.

In a second comparative example shown in FIG. 5, positions of the power source apparatus 10 and the power source apparatus 20 connected to the grid power source line L0 are reversed. That is, the junction P2 is provided nearer the grid power source 1 with respect to the junction P1. Further, the power source apparatus 20 has one current sensor CT2, and the current sensor CT2 is provided between the grid power source 1 and the junction P2. The current sensor CT1 of the power source apparatus 10 is provided between the junction P1 and the junction P2. In such a configuration, the power source apparatus 10 is preferentially used all the time, and it is not possible to preferentially use the power source apparatus 20.

Figure 6:
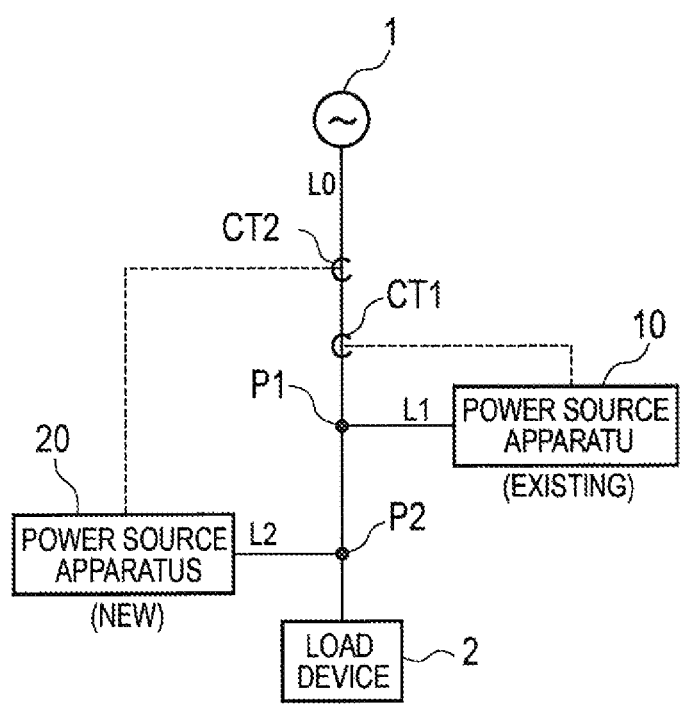
FIG. 6 shows a third comparative example of the embodiment of the present invention.

In a third comparative example shown in FIG. 6, the power source apparatus 20 has one current sensor CT2, and the current sensor CT2 is provided between the grid power source 1 and the junction P1, similarly to the current sensor CT1. In such a configuration, the power source apparatus 10 and the power source apparatus 20 may simultaneously start/suspend the output, and it is difficult to provide a stable operation.

On the other hand, according to the above-described embodiment, it is possible to provide a stable operation and it is possible to switch the preferentially used power source apparatus (that is, switch a mode between the first priority mode and the second priority mode).

Example

Next, an example of a power supply system will be described where the power source apparatus 10 is a fuel cell (fuel cell unit) and the power source apparatus 20 is a storage battery (storage battery unit). However, a description of a configuration common to the above-described embodiment will be omitted.

Figure 7:
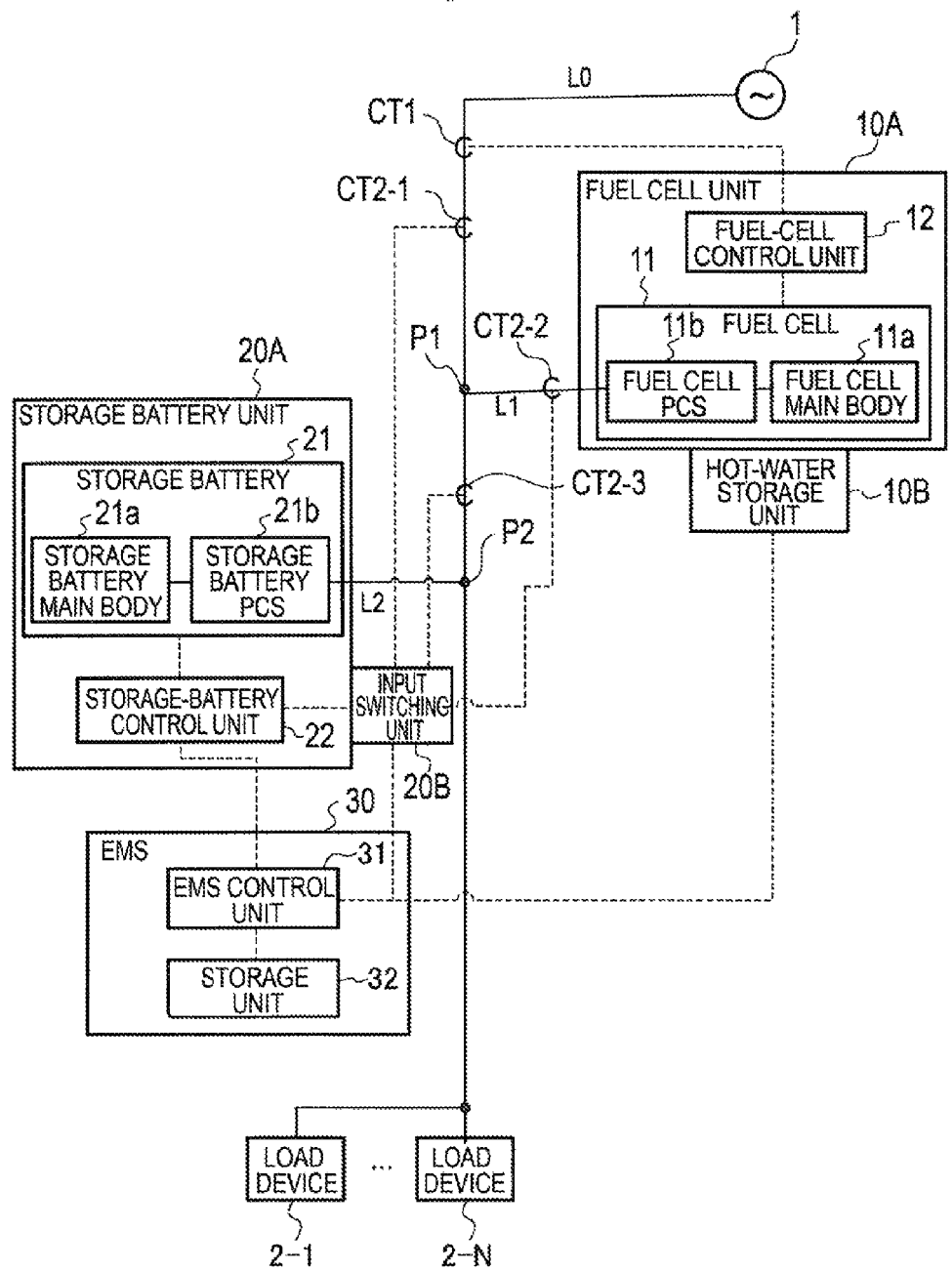
FIG. 7 is a block diagram of a power supply system according to an example of the present invention.

FIG. 7 is a block diagram of the power supply system according to the present example. In FIG. 7, a solid line between blocks indicates a power source line and a dotted line between blocks indicates a control line.

As shown in FIG. 7, the power supply system according to the present example includes the grid power source 1, a plurality of load devices 2, a fuel cell unit 10A, a hot-water storage unit 10B, a storage battery unit 20A, an input switching unit 20B, and an energy management system (EMS) 30. The load device 2 is a device operated by consuming alternate-current (AC) power, and examples thereof include a home electric appliance and a business-use appliance.

The power source line L1 of the fuel cell unit 10A is joined with the grid power source line L0 at the junction P1. The power source line L2 of the storage battery unit 20A is joined with the grid power source line L0 at the junction P2.

The fuel cell unit 10A includes a fuel cell 11 and a fuel-cell control unit 12.

The fuel cell 11 performs an interconnection operation with the grid power source 1. The fuel cell 11 includes a fuel cell main body 11a and a fuel cell power conditioner (PCS) 11b. The fuel cell main body 11a may be SOFC (Solid Oxide Fuel Cell), or may be PEFC (Polymer Electrolyte Fuel Cell), for example. The fuel cell main body 11a generates power by a chemical reaction between hydrogen extracted from natural gas, for example, and oxygen in the air, and outputs direct-current (DC) power to the fuel cell PCS 11b. An amount of power generated by the fuel cell main body 11a changes according to an amount of gas and air consumed in the fuel cell main body 11a. Further, the amount of gas and air is controlled by the fuel-cell control unit 12. The fuel cell PCS 11b converts the DC power from the fuel cell main body 11a into AC, and outputs the AC power via the power source line L1. It should be noted that the reverse power flow (sale of power), to the grid power source 1, of the output power from the fuel cell 11 may not be permitted.

The fuel-cell control unit 12 controls the fuel cell 11 to perform a load following operation on the basis of the output from the current sensor CT1. The fuel-cell control unit 12 sets target output power from the fuel cell 11 so that power purchased from the grid power source 1 is zero, for example, and controls the fuel cell 11 so that the output power from the fuel cell 11 is the target output power.

The fuel cell unit 10A is provided with the hot-water storage unit 10B, for example. The hot-water storage unit 10B stores the hot water obtained by heat exchange with the exhaust heat generated during the power generation in the fuel cell 11. An amount of hot water to be stored in the hot-water storage unit 10B is notified to the EMS 30 via the control line.

The storage battery unit 20A includes a storage battery 21 and a storage battery control unit 22.

The storage battery 21 performs an interconnection operation with the grid power source 1. The storage battery 21 includes a storage battery main body 21a and a storage battery PCS 21b. The storage battery main body 21a charges DC power output from the storage battery PCS 21b. Further, the storage battery main body 21a outputs the DC power, by way of electric discharge, to the storage battery PCS 21b. During the storage battery main body 21a being charged, the storage battery PCS 21b converts the AC power input via the power source line L2 into DC, and outputs the DC power to the storage battery main body 21a. Further, during the storage battery main body 21a being discharged, the storage battery PCS 21b converts the DC power from the storage battery main body 21a into AC, and outputs the AC power via the power source line L2. It should be noted that the reverse power flow (sale of power), to the grid power source 1, of the output power from the storage battery 21 may not be permitted.

The storage battery control unit 22 controls the output of power (discharge of power) from the storage battery 21 on the basis of each of the outputs from the current sensor CT2-1, the current sensor CT2-2, and the current sensor CT2-3. Further, the storage battery control unit 22 implements a flow shown in FIG. 2 and FIG. 3. In the present example, the above-described first priority mode is a mode in which the fuel cell 11 is preferentially used (hereinafter, referred to as "fuel cell priority mode"). On the other hand, in the present example, the above-described second priority mode is a mode in which the storage battery 21 is preferentially used (hereinafter referred to as "storage battery priority mode").

The input switching unit 20B is provided with the storage battery unit 20A. The input switching unit 20B is provided between: the storage battery unit 20A; and each of outputs of the current sensor CT2-1, the current sensor CT2-2, and the current sensor CT2-3. The input switching unit 20B switches the input to the storage battery unit 20A from among the output from the current sensor CT2-1, the output from the current sensor CT2-2, and the output from the current sensor CT2-3, in accordance with the priority mode (the fuel cell priority mode or the storage battery priority mode) of the storage battery unit 20A.

If the storage battery unit 20A has only one input for a sensor, then it is not possible to utilize three current sensors (CT2-1, CT2-2, and CT2-3). Therefore, in the present example, in order to utilize the three current sensors (CT2-1, CT2-2, and CT2-3) even when there is only one input for a sensor in the storage battery unit 20A, the input switching is performed by the input switching unit 20B.

The EMS 30 performs power management in the consumer. In the present example, the EMS 30 corresponds to a control device. The EMS 30 includes an EMS control unit 31 and a storage unit 32.

The EMS control unit 31 manages power consumed in the load device 2 and an amount of power purchased from the grid power source 1. Alternatively, the EMS control unit 31 uses a signal that complies with a communication protocol such as Echonet Lite or Zig Bee (registered trademark) to perform control for saving power on the load device 2.

In the present example, the EMS control unit 31 uses a signal that complies with a communication protocol such as Echonet Lite to output a mode switching command to the storage battery unit 20A, and the fuel cell priority mode and the storage battery priority mode of the storage battery unit 20A are thereby switched. Further, in accordance with whether the storage battery unit 20A is in the fuel cell priority mode or in the storage battery priority mode, the EMS control unit 31 uses a signal that complies with a communication protocol such as Echonet Lite to output an input switching command to the input switching unit 20B.

The storage unit 32 stores a power-generation unit price of the fuel cell 11 and a discharge unit price of the storage battery 21. These pieces of information may be information obtained from an external network or information obtained by a user's input, and these preferably are updated to most recent information, where appropriate. The power-generation unit price is a power-generation cost (gas charge) per unit power, for example. The discharge unit price is an electricity charge per unit power when the storage battery 21 is charged by the power from the grid power source 1, for example. The EMS control unit 31 selects a relatively more reasonable unit price on the basis of the power-generation unit price of the fuel cell 11 and the discharge unit price of the storage battery 21, and switches the fuel cell priority mode and the storage battery priority mode.

Alternatively, the EMS control unit 31 may switch the fuel cell priority mode and the storage battery priority mode of the storage battery unit 20A, on the basis of the amount of hot water stored in the hot-water storage unit 10B. For example, the EMS control unit 31 selects the fuel cell priority mode until the amount of hot water stored in the hot-water storage unit 10B reaches a desired amount of hot water stored, and selects the storage battery priority mode after the amount of hot water stored in the hot-water storage unit 10B reaches the desired amount of hot water stored.

Other Embodiments

The present invention is explained through the above-described embodiments, but it must not be understood that this invention is limited by the statements and the drawings constituting a part of this disclosure. From this disclosure, various alternative embodiments, examples, and operational technologies will become apparent to those skilled in the art.

For example, the description proceeds with the case where the power supply system according to the above-described embodiments includes the power source apparatus 10 and the power source apparatus 20 in which the reverse power flow of the output power to the grid power source 1 is prohibited. However, the power supply system may further include a solar power generator in which the reverse power flow of the output power to the grid power source 1 is enabled, for example. In such a case, the solar power generator preferably is provided nearer the grid power source 1 with respect to the power source apparatus 10 and the power source apparatus 20.

Further, in the above-described embodiments, the EMS 30 is described as the control device as an example. The EMS 30 may be HEMS (Home Energy Management System) that manages power of a house, may be BEMS (Building Energy Management System) that manages power of a building, may be FEMS (Factory Energy Management System) that manages power of a factory, or may be CEMS (Community Energy Management System) that manages power of a region.

In the above-described embodiments, the description proceeds with the case where the current sensor CT1 of the power source apparatus 10 and the current sensor CT2-1 of the power source apparatus 20 are provided on the grid power source line L0 between the grid power source 1 and the junction P1. However, the current sensor CT1 and the current sensor CT2-1 may be provided as commonly used single current sensor.

As described above, needless to say, the present invention includes various embodiments and the like not described here. Moreover, it is also possible to combine the above-described embodiments and modifications. Therefore, the technical range of the present invention is to be defined only by the inventive specific matter according to the adequate claims from the above description.

It is noted that the entire content of Japanese Patent Application No. 2012-010500 (filed on Jan. 20, 2012) is incorporated in the present specification by reference.

INDUSTRIAL APPLICABILITY

According to the present invention, it is possible to provide a power supply system capable of switching a preferentially used power source apparatus, and a power source apparatus.

The invention claimed is:

1. A power supply system, comprising:
a first power source apparatus and a second power source apparatus electrically connected with a grid power source line provided between a grid power source and a load device,
a power source line of the first power source apparatus being joined with the grid power source line at a first junction, and
a power source line of the second power source apparatus being joined with the grid power source line at a second junction provided nearer the load device with respect to the first junction,
wherein the power supply system comprises:
a first current sensor provided on the grid power source line between the grid power source and the first junction;

a second current sensor provided on the power source line of the first power source apparatus between the first power source apparatus and the first junction; and a third current sensor provided on the grid power source line between the first junction and the second junction;

wherein the second power source apparatus controls output of power from the second power source apparatus itself, on the basis of the outputs from the first current sensor and the second current sensor, in a first priority mode in which the first power source apparatus provides power to the load device prior to the second power source apparatus, and the second power source apparatus controls the output of power from the second power source apparatus itself, on the basis of the outputs from the third current sensor, in a second priority mode in which the second power source apparatus provides power to the load device prior to the first power source apparatus.

2. The power supply system according to claim 1, wherein in the first priority mode, the second power source apparatus suspends the output of power from the second power source apparatus itself until the first power source apparatus operates by regulated output, on the basis of the output from the second current sensor.

3. The power supply system according to claim 2, wherein in the first priority mode, the second power source apparatus checks, on the basis of the output from the second current sensor, whether the first power source apparatus is operated by the regulated output, and when power purchased from the grid power source is detected on the basis of the output from the first current sensor, the second power source apparatus outputs power from the second power source apparatus itself.

4. The power supply system according to claim 1, wherein in the second priority mode where the second power source apparatus is preferentially used, the second power source apparatus outputs the power from the second power source apparatus itself, while preventing a reverse power flow to the grid power source on the basis of the output from the third current sensor.

5. The power supply system according to claim 4, further comprising: an input switching unit that is provided between each of the outputs from the first current sensor, the second current sensor, and the third current sensor, and the second power source apparatus, wherein the input switching unit switches input to the second power source apparatus from among the output from the first current sensor, the output from the second current sensor, and the output from the third current sensor, in accordance with the priority mode of the second power source apparatus.

6. The power supply system according to claim 5, further comprising: a control device that controls to switch the priority mode of the second power source apparatus on the basis of an output-power unit price of the first power source apparatus and an output-power unit price of the second power source apparatus.

7. The power supply system according to claim 5, further comprising: a control device, wherein the first power source apparatus or the second power source apparatus is a fuel cell with which a hot-water storage device is provided, and the control device controls to switch the priority mode of the second power source apparatus on the basis of an amount of hot water stored in the hot-water storage device.

8. A power supply system, comprising:
a first power source apparatus and a second power source apparatus electrically connected with a grid power source line provided between a grid power source and a load device,
a power source line of the first power source apparatus being joined with the grid power source line at a first junction, and
a power source line of the second power source apparatus being joined with the grid power source line at a second junction provided nearer the load device with respect to the first junction,
wherein the power supply system comprises:
a first current sensor provided on the grid power source line between the grid power source and the first junction; and
a second current sensor provided on the power source line of the first power source apparatus between the first power source apparatus and the first junction;
wherein the second power source apparatus controls the output of power from the second power source apparatus itself, on the basis of each of the outputs from the first current sensor and the second current sensor, in a first priority mode in which the first power source apparatus provides power to the load device prior to the second power source apparatus.

9. A power source apparatus electrically connected with a grid power source line provided between a grid power source and a load device, comprising:
a first current sensor provided on the grid power source line between the grid power source and a first junction;
a second current sensor provided on a power source line of an alternate power source apparatus between the alternate power source apparatus and the first junction;
a third current sensor provided on the grid power source line between the first junction and a second junction; and
a controller configured to control output of power from the power source apparatus itself;
wherein
the power source line of the alternate power source apparatus is joined with the grid power source line at the first junction,
the power source line of the power source apparatus is joined with the grid power source line at the second junction provided nearer the load device with respect to the first junction,
the controller controls the output of power from the power source apparatus itself, on the basis of the outputs from the first current sensor and the second current sensor, in a first priority mode in which the alternate power source apparatus provides power to the load device prior to the power source apparatus, and
the controller controls the output of power from the power source apparatus itself, on the basis of the outputs from the third current sensor, in a second priority mode in which the power source apparatus provides power to the load device prior to the alternate power source apparatus.

10. A power source apparatus electrically connected with a grid power source line provided between a grid power source and a load device, comprising:
a first current sensor provided on the grid power source line between the grid power source and a first junction;

a second current sensor provided on a power source line of an alternate power source apparatus between the alternate power source apparatus and the first junction; and a controller configured to control output of power from the power source apparatus itself;

wherein the power source line of the alternate power source apparatus is joined with the grid power source line at the first junction, the power source line of the power source apparatus is joined with the grid power source line at a second junction provided nearer the load device with respect to the first junction, and the controller controls the output of power from the power source apparatus itself, on the basis of each of the outputs from the first current sensor and the second current sensor, in a first priority mode in which the alternate power source apparatus provides power to the load device prior to the power source apparatus.

* * * * *